United States Patent [19]

Patel

[11] Patent Number: 5,172,257
[45] Date of Patent: Dec. 15, 1992

[54] TWISTED FERROELECTRIC LIQUID CRYSTAL MODULATOR FOR PROVIDING GRAY SCALE

[75] Inventor: Jayantilal S. Patel, Red Bank, N.J.

[73] Assignee: Bell Communications Research, Inc., Livingston, N.J.

[21] Appl. No.: 790,681

[22] Filed: Nov. 8, 1991

[51] Int. Cl.$^5$ .............................................. G02F 1/13
[52] U.S. Cl. ....................................... 359/84; 359/63; 359/70; 359/77; 359/100
[58] Field of Search ................. 359/84, 63, 77, 93, 359/94, 100, 70, 78

[56] References Cited

U.S. PATENT DOCUMENTS

| | | | |
|---|---|---|---|
| 4,586,791 | 5/1986 | Isogai et al. | 359/78 |
| 4,662,721 | 5/1987 | Harada et al. | 359/77 |
| 4,779,959 | 10/1988 | Saunders | 359/84 |
| 4,832,462 | 5/1989 | Clark et al. | 359/100 |
| 4,900,132 | 2/1990 | Bos | 359/100 |
| 5,035,491 | 7/1991 | Kawagishi et al. | 359/63 |
| 5,061,047 | 10/1991 | Bradshaw et al. | 359/63 |
| 5,071,228 | 12/1991 | Waldmann et al. | 359/63 |

FOREIGN PATENT DOCUMENTS 0032520 2/1988 Japan ..................................... 359/77

OTHER PUBLICATIONS

J. S. Patel et al., "Ferroelectric liquid crystal devices," *Proceedings of SPIE,* 1986, vol. 613, pp. 130-134.
J. S. Patel et al., "Properties and applications of ferroelectric liquid crystals," *Optical Engineering,* 1987, vol. 26, pp. 373-384.
J. S. Patel, "Electro-optics of ferroelectric liquid crystals," *Proceedings of SPIE,* 1985, vol. 567, pp. 81-85.
J. S. Patel et al., "Alignment of liquid crystals which exhibit cholesteric to smectic C* phase transitions," *Journal of Applied Physics,* 1986, vol. 59, pp. 2355-2360.

*Primary Examiner*—William L. Sikes
*Assistant Examiner*—Huy K. Mai
*Attorney, Agent, or Firm*—Leonard Charles Suchyta; Charles S. Guenzer

[57] ABSTRACT

A twisted ferroelectric liquid-crystal optical modulator in which a ferroelectric smectic C* liquid crystal (26) is filled into the gap between two alignment layers (18, 20) aligning the adjacent liquid crystal in two perpendicular directions parallel to the alignment layers. The ferroelectric liquid crystal has a tilt angle of 45° and is aligned with the tilt angle parallel to the buffing direction of the alignment layer. Thereby, the liquid-crystal molecules (32), absent any applied field from electrodes (14, 18), slowly twists through 90° across the gap, and the liquid crystal waveguides light linearly polarized by an input polarizer (22) so that it passes a perpendicularly arranged output polarizer (24). However, a strong electric field causes the ferroelectric molecules to untwist and line up in parallel. Waveguiding is destroyed, and the cell does not transmit. Intermediate voltages cause partial untwisting and partial waveguiding. Thus, variations in the applied voltages can modulate the light according to a gray scale.

10 Claims, 4 Drawing Sheets

TWISTED FERROELECTRIC LIQUID CRYSTAL MODULATOR FOR PROVIDING GRAY SCALE

FIELD OF THE INVENTION

The invention relates generally to liquid-crystal devices. In particular, the invention relates to a light modulator made from a ferroelectric liquid crystal.

BACKGROUND ART

Electro-optic modulators using nematic liquid crystals are extensively used as displays, spatial light modulators, and other specialized optical elements. Most of these use a twisted nematic liquid crystal which is aligned at opposite sides of the cell in perpendicular planar directions. The average direction in which the long axes of the liquid-crystal molecules point is called the director. Thus, the directors at the two inner surfaces of the cell are parallel to the surfaces but perpendicular to each other. In between the two sides, absent other effects, the director slowly twists through 90°. The liquid crystal is birefringent; that is, it has a refractive index difference $\Delta n$ between the directions parallel and perpendicular to the director. If $$\Delta n \cdot d \gg \lambda, \tag{1}$$

where d is the thickness of the cell and $\lambda$ is the wavelength of light, then the linear polarization of light traversing the cell follows the twist; that is, the twisted nematic waveguides the light. In the usual configuration, sheet polarizers are placed on both sides of the cell in correspondence with the alignment direction, that is, in perpendicular orientations. Thus, the undistorted, slowly twisted nematic liquid crystal waveguides the light and therefore rotates the linear polarization of the light so whatever passes through the first polarizer also passes through the second polarizer. However, if a voltage is applied across the cell, the liquid-crystal molecules are reoriented due to a dielectric torque, and the molecules become aligned with the field, thus destroying the slow twist which produced the waveguiding.

On the other hand, several classes of ferroelectric liquid-crystal devices have been proposed. See, for example, the review articles by Patel et al., "Ferroelectric liquid crystal devices," *Proceedings of SPIE*, volume 613, 1986, pp. 130-134 and "Properties and applications of ferroelectric liquid crystals", *Optical Engineering*, volume 26, 1987, pp. 373-384. A ferroelectric liquid crystal is one in which the liquid-crystal molecule is chiral and forms smectic layers. In such a system, a polarization develops having a vector direction within the plane of the layer and perpendicular to the director. See Patel, "Electro-optics of ferroelectric liquid crystals," *Proceedings of SPIE*, volume 567, 1985, pp. 81-85. In most ferroelectric liquid-crystal devices, such as disclosed by Isogai et al. in U.S. Pat. No. 4,586,791, the material is confined between two glass plates such that the director lies in the surface plane at the surfaces. In this geometry, if the cell surfaces are rubbed in a particular direction, then the smectic layers develop in the smectic A phase such that the smectic planar layers are normal to the surface and the layer normal is parallel to the rubbing direction. When this material is cooled into the smectic C phase, two degenerate states are possible, due to the fact that the tilt angle in the smectic C* phase has a non-zero value of the tilt angle (defined with respect to the layer normal) and it could be positive or negative. Thus, in presence of an electric field applied across the two surfaces, the spontaneous polarization couples with the applied electric field and forces the molecules to reorient such that the molecules are collinear throughout the cell. The orientation of the molecules is such that it lies in the surface plane and at an angle equal to the tilt angle with respect to the rubbing axis. The direction of the applied electric field determines whether the molecules tilt at positive or negative tilt angles. When the prior-art smectic C* liquid crystals are so formed, the low temperature tilt angle is generally about ±22° but it then decreases with temperature to a 0° tilt angle, at which point there is a transition to the cholesteric phase.

In the case of materials that don't possess a smectic A phase, the material behaves quite differently. In this case the materials usually has a higher temperature cholesteric phase, that is, a chiral liquid crystal that does not possess a layered structure. Thus, when a material with a higher temperature cholesteric phase is introduced into a cell which has been rubbed in a particular direction, the liquid crystal aligns with the director parallel to the rubbing axis in the cholesteric phase. This material when further cooled into the smectic C phase, the director orientation is essentially preserved, but the molecules form a layered structures with the layer normal at an angle equal to the tilt angle to the rubbing axis. The tilt angle in these materials is generally about 45° and fairly independent of temperature.

SUMMARY OF THE INVENTION

The invention can be summarized as a twisted ferroelectric liquid-crystal optical modulator in which a ferroelectric liquid crystal is aligned in perpendicular directions at the opposed faces of the liquid-crystal cell. Polarizers are placed on the sides of the cell. When no voltage is applied across the cell, the light is waveguided by the twisted liquid crystal. However, an applied voltage untwists the liquid crystal, which becomes for the most part aligned with one of the alignment directions, except very close to one of the surfaces, thereby destroying the twisting mechanism of the waveguiding, and the light is blocked. However, smaller applied voltages only partially untwist the liquid crystal. Partial waveguiding then elliptically polarizes the initially linearly polarized light. Thereby, the voltage continuously controls the amount of transmitted light, providing gray-scale modulation.

BRIEF DESCRIPTION OF THE PREFERRED EMBODIMENT

DETAILED DESCRIPTION

Figure 1:
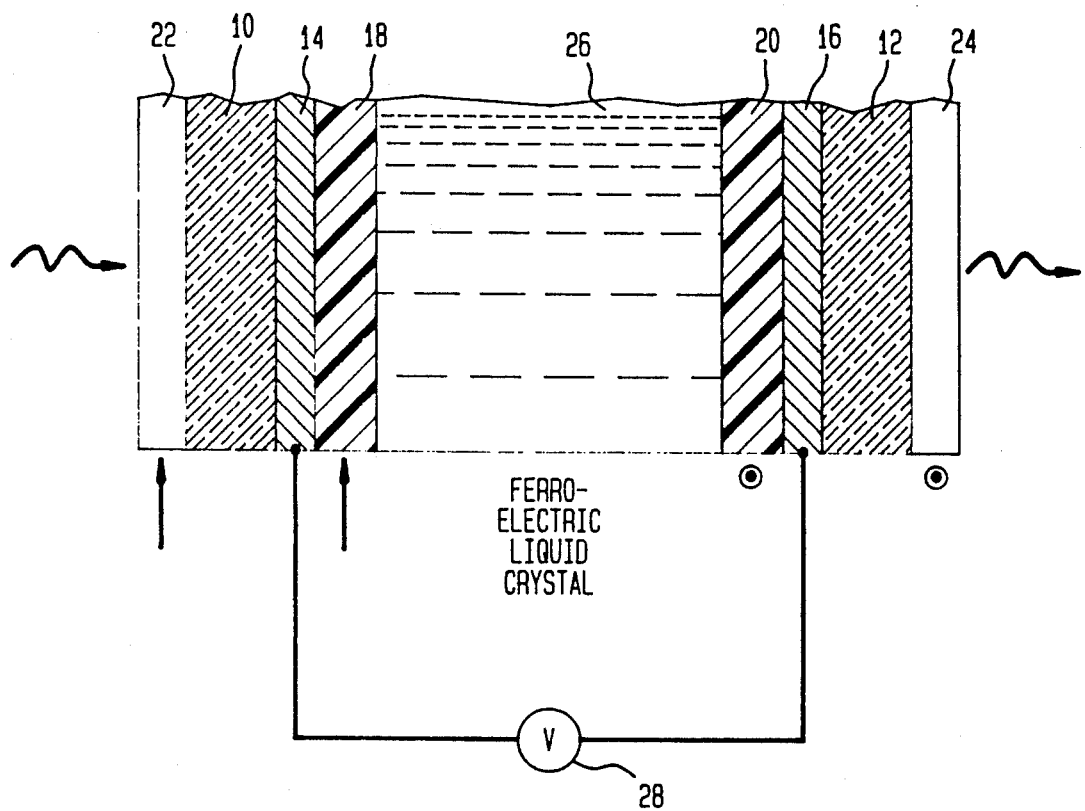
FIG. 1 is a cross-sectional view of a first embodiment of the invention for an optical modulator.

A twisted, ferroelectric liquid-crystal modulator is illustrated in the cross-sectional view of FIG. 1. Two glass plates serve as substrates 10 and 12 for each of the side assemblies of the cell. Thin, transparent electrodes 14 and 16, for example, of indium-tin-oxide are coated on one side of the substrates 14 and 16. Homogeneous alignment layers 18 and 20 formed on top of the transparent electrodes 14 and 16 are buffed in perpendicular directions, as viewed in the finally assembled cell, so as to align adjacent liquid-crystal molecules in perpendicular alignment directions on the two sides of the cell and parallel to the sides. Linearly polarizing sheets 22 and 24 are placed on the other sides of the substrates 10 with their polarization directions parallel to the alignment directions of their respective side assembly. Similar operational effect is achieved if the polarization axes are perpendicular to the respective rubbing axes. The polarization directions may be alternatively arranged for different optical effects. The two side assemblies are assembled in parallel with a small, predetermined gap of a few micrometers between them. In the assembly, the buffing directions of the two alignment layers 18 and 20 are set to be essentially perpendicular. A ferroelectric liquid crystal 26 is filled into the gap, and its surfaces aligned with the alignment layers 18 and 20 are such that at each surface one of the two stable tilt angles is aligned parallel to the alignment (buffing) direction.

A voltage signal source 28 is connected across the electrodes 14 and 16 of the cell. In the absence of an impressed voltage, the liquid crystal slowly twists through 90° between the perpendicularly buffed alignment layers 18 and 20. Light incident on the cell, for example, from the left, is linearly polarized by the input polarizer 22, and this direction corresponds to the alignment of the ferroelectric liquid crystal at the left of the cell gap. Since the condition of Eqn. (1) is satisfied, the linearly polarized light is then waveguided along the slowly twisting director of the liquid crystal 26 until it strikes the right alignment layer 20 in parallel to its alignment direction and parallel to the polarization direction of the output polarizer (analyzer) 24. That is, in the absence of an applied voltage, the liquid crystal modulator passes the light.

However, if the voltage source 28 impresses an electric field across the liquid crystal, the polarization vector associated with and perpendicular to each ferroelectric liquid-crystal molecule causes the molecule to align perpendicularly to the electric field. Virtually all of the liquid-crystal molecules thereby become aligned with the alignment direction of one of the alignment layers 18 or 20. As a result, the ferroelectric liquid crystal untwists itself, the condition of Eqn. (1) is no longer satisfied, and the linearly polarized light is not waveguided. In the absence of waveguiding, the polarization direction of the light does not rotate as it traverses the liquid crystal, and the light hits the analyzer 24 at a perpendicular polarization and is absorbed by it. That is, in the presence of a large applied field, the ferroelectric liquid crystal modulator blocks light.

On the other hand, at relatively small applied voltages, the untwisting is only partial and the waveguiding is partially accomplished. The light becomes elliptically polarized. The portion of the input light that the liquid crystal converts (waveguides) to the perpendicular polarization is passed by the analyzer 24 while the portion that remains in its input polarization is blocked. The ratio of the two portions depends on the applied voltage. Therefore, in the voltage regime of observable elliptical polarization, the amount of light which is absorbed varies monotonically and continuously with the applied voltage, and the twisted ferroelectric liquid-crystal modulator provides gray-scale modulation. Binary modulation provides only two intensity levels. A gray-scale modulation provides more than two.

Optical modulator made from twisted nematic and from twisted ferroelectric liquid crystal have similar gross structure and provide similar operational results (with the exception of a usable gray scale). However, the actual physical processes on the molecular level of the liquid crystals differ significantly. Ferroelectric liquid crystals consist of chiral molecules arranged in a layered structure. The following discussion applies only to ferroelectric smectic C* liquid crystals although similar effects are observed in other ferroelectric liquid crystals. In the present configuration, as illustrated in perspective in FIG. 2, smectic layers 30 extend perpendicularly between the alignment layers 18 and 20. Within each smectic layer 30, liquid-crystal molecules 32 tilt with respect to the layer normal at an angle called the tilt angle, that is, they may lie along a cone having a right circular section 34 and centered on the layer normal. A ferroelectric liquid-crystal molecule 32 further has a polarization vector $\vec{P}$ which lies parallel to the cone's section 34 at the point the molecule 32 intersects the section 34.

The two alignment layers 18 and 20 strongly anchor the adjacent liquid-crystal molecules and cause them to be aligned with one of their two stable tilt angles in parallel to their respective rubbing axes 36 and 38, that is, at 90° between them. In the gap of the cell, the liquid-crystal molecules slowly twist through 90°. However, in the ferroelectric liquid crystal, the liquid-crystal molecules not only twist, they also precess around the respective cones 34. (The illustrated direction of precession is one of two degenerate directions.) Nonetheless, the twisted liquid crystal waveguides incident linearly polarized light 40.

Figure 3:
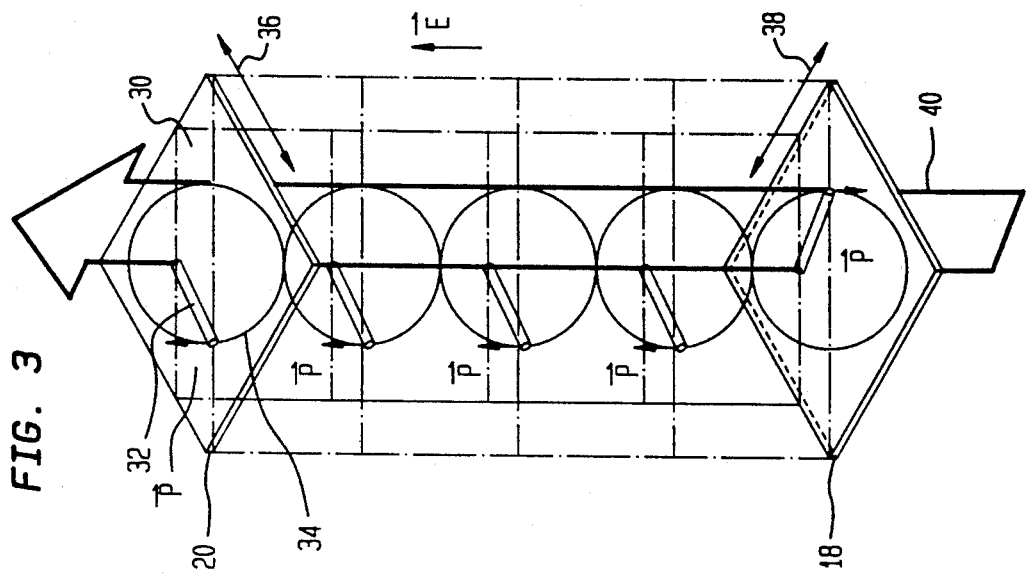
FIGS. 2 and 3 are perspective views illustrating the operation of the modulator of FIG. 1.

However, when a substantial voltage is applied across the electrodes 14 and 16 so as to induce an electric field $\vec{E}$ across the cell gap, as illustrated in the perspective view of FIG. 3, the polarization vectors $\vec{P}$ associated with the liquid-crystal molecules 32 attempt to align with the electric field $\vec{E}$. The ferroelectric nature of the molecules 32 constrain them to the cones 34. Therefore, the bulk of the molecules 32 become aligned with the one alignment layer 20 that induces a polarization vector $\vec{P}$ parallel to the applied field $\vec{E}$. Only a small portion of the molecules 32 adjacent to the other alignment layer 18 have an alignment energy which is not overcome by the polarization energy. As a result, a highly twisted but very thin layer forms near one of the surfaces. The rapid twist causes the condition of Eqn. (1) to not be satisfied, and therefore the linear polarization of the light is not significantly rotated and is absorbed at the opposing analyzer 24.

Figure 2:
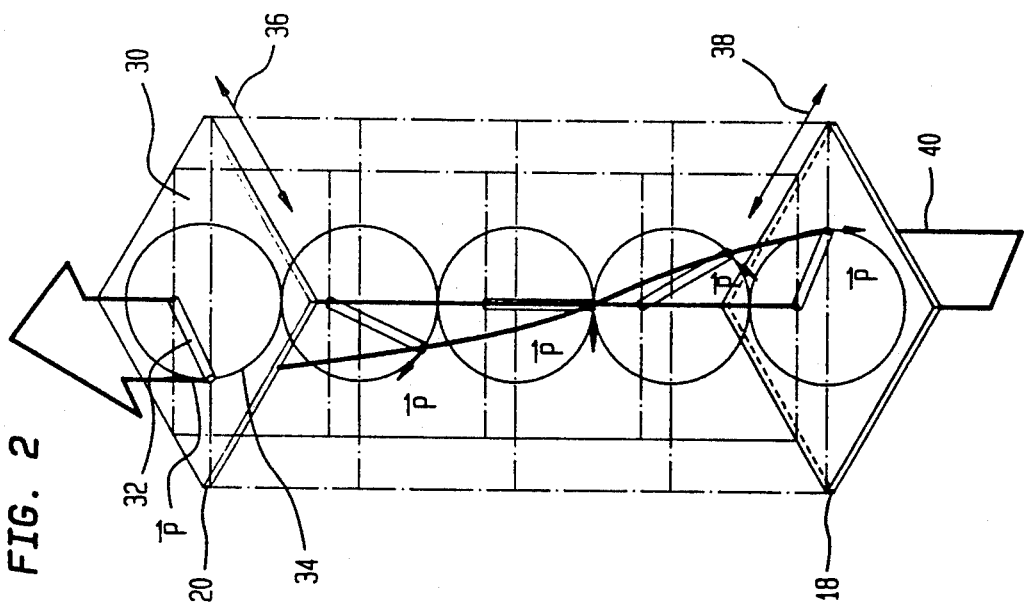

The gray-scale regime occurs at intermediate voltages between those of FIGS. 2 and 3 such that the untwisting of the structure of FIG. 2 is incomplete and partial waveguiding is accomplished.

EXAMPLE 1

The twisted ferroelectric liquid-crystal modulator of FIG. 1 was fabricated and optically tested. Indium-tin-oxide was deposited on soda-lime glass substrates and patterned to produce a 1 cm × 1 cm area. The aligning material was poly(1,4-butylene terephthalate) coated to a thickness of about 30 nm and then buffed in a single direction. These cell side assemblies were placed together with the buffing directions perpendicular to each other and with spherical spacers of 2.5 μm diameter defining the gap. The resultant gap was measured at 2.6 μm. The gap was filled with a ferroelectric liquid crystal, Type CS 2004 commercially available from the Chisso Corporation. Following the procedure described by Patel et al. in "Alignment of liquid crystals which exhibit cholesteric to smectic C* phase transitions," *Journal of Applied Physics*, volume 59, 1986, pp. 2355-2360, a large AC electric field was applied to the sample at an elevated temperature close to the transition temperature of about 62° C. between the cholesteric and smectic C* phases to cause the smectic layers to be aligned at ~45° to the rubbing axes. That is, the smectic C* liquid crystal is aligned with one of its two stable tilt angles parallel to the adjacent rubbing axis. Polar surface interactions breaks the degeneracy between the two possible layer orientations with respect to the rubbing axes. With such an alignment procedure, the stable tilt angle is nearly temperature independent at 45°. An ideal liquid-crystal material would convert directly from the isotropic phase into the smectic C* phase with a 45° alignment of the smectic layers with respect to the rubbing direction. For a particular layer orientation, two domains were sometimes observed, corresponding to the two possible director orientations in the middle of the cell, that is, the two precession directions. It is possible to convert such sample to a mono-domain sample by leaving the sample in a high AC electric field of 50 V/μm for a minute. In the experimental example, polarizers in an optical microscope replaced the polarizing sheets.

Figure 4:
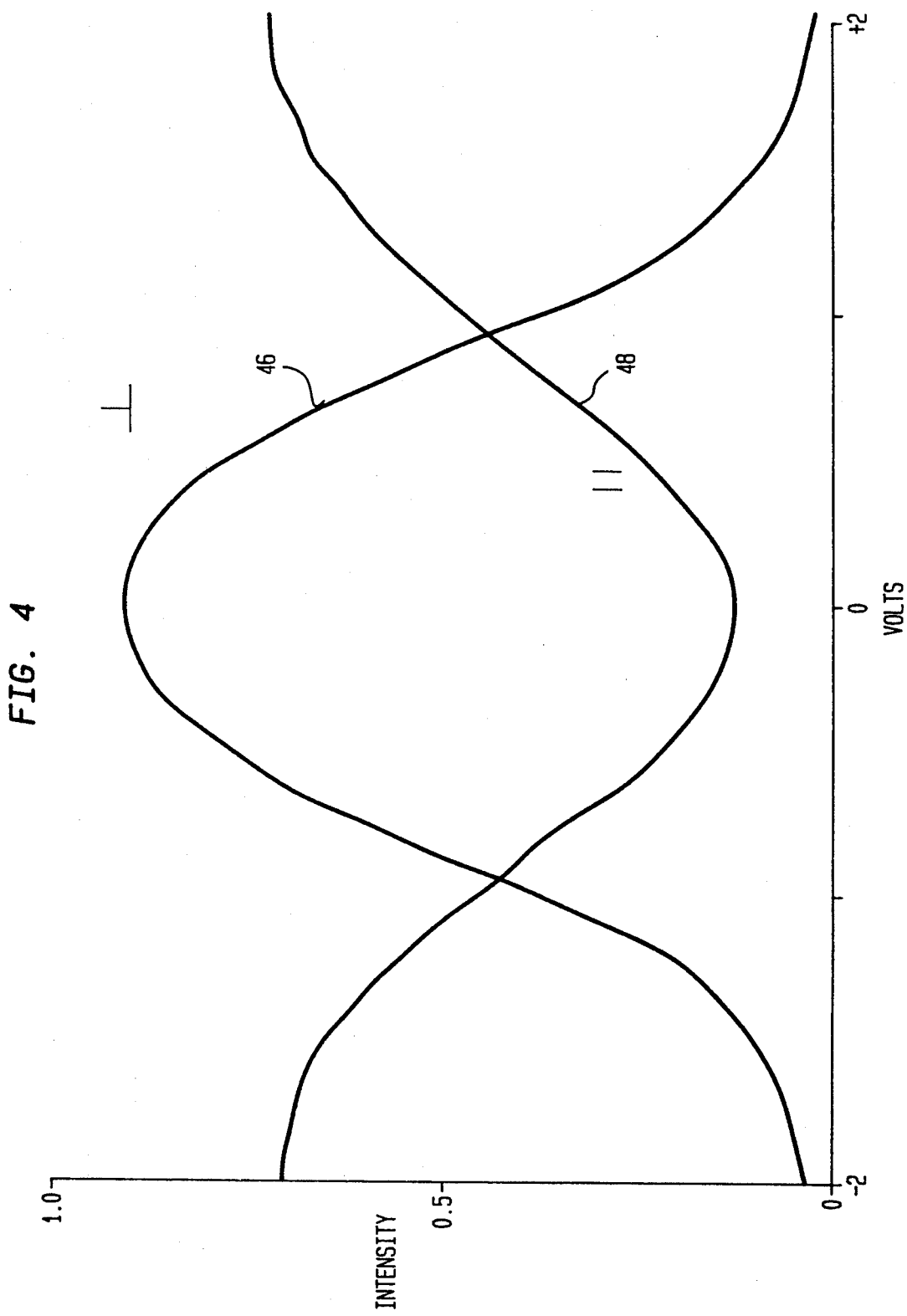
FIG. 4 is a graph of data illustrating the gray-scale voltage dependence of the optical modulation of the invention.

The optical modulator of the example was tested using an arbitrary-waveform generator programmed to produce a 5 ms pulse of amplitude V followed by no voltage for 5 ms and then a similar pulse of opposite polarity. This sequence avoided prolonged DC field exposure found to produce gradual changes in the transmitted intensity. The liquid-crystal cell was precisely held at a temperature near room temperature. Visible light irradiated the cell, and the transmitted intensity was detected by a photo-diode, the output pulses of which were monitored on an oscilloscope. The data of FIG. 4 show the relative intensities for both the positive and negative pulses, which are equal. The polarizers 22 and 24 were arranged to have their polarization directions to be perpendicular, which is the configuration of FIGS. 1-3, for the data of curve 46 and to be parallel for the data of curve 48. Thus, changing the relative orientations nearly reverses the voltage dependence of the contrast. The lack of total mirror symmetry between the curves 46 and 48 indicates that the waveguiding condition of Eqn. (1) is not fully satisfied. Thus, the gray scale of transmission is wavelength dependent and should be optimized for a given wavelength by choice of the sample thickness. The contrast saturates above 2 V, at which point the contrast ratio is better than 25:1. Yet higher voltages degrade the contrast because they reorient the molecules at the surface. Switching times are less than a millisecond for both the electrically driven untwisting and the electrically driven retwisting, but they improve at higher temperatures. The short switching times apparently derive from the fact that the surface molecules need not reorient.

Cells with thicker cell gaps have been built, but inferior results were observed for 10 μm thick samples because of the abundance of the multiple domains. The twisted configuration is stable in a thickness regime $$d_1 < d < d_2 \qquad (2)$$

where the lower limit $d_1$ is established by the surface coherence length being longer than $d/2$, where d is the sample thickness. For the described structure, $d_1$ would likely be established by Eqn. (1). The upper limit $d_2$ corresponds to the onset of the dechiralization lines which would make the sample inhomogeneous in the plane of the sample cell. This distance would be of the order of the pitch of the smectic C* helical structure.

Figure 5:
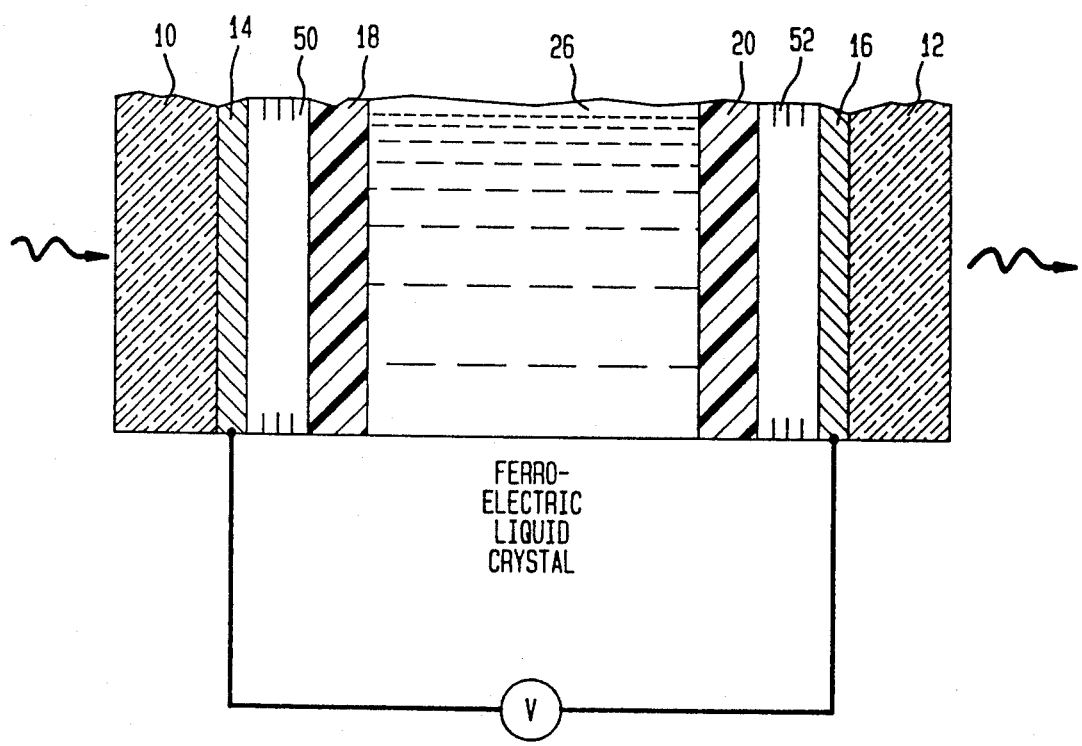
FIG. 5 is a cross-section view a second embodiment of the invention for a Fabry-Perot filter.

Twisted ferroelectric liquid crystals can also be used in a tunable Fabry-Perot filter. As illustrated in the cross-sectional view of FIG. 5, the structure of the tunable filter differs from that of the optical modulator of FIG. 1 by the addition of dielectric interference mirrors 50 and 52 between the alignment layers 18 and 20 and the associated transparent electrodes 14 and 16. Depending upon the application, polarizers may not be needed. The simpler embodiments of the ferroelectric Fabry-Perot filter depend upon the tilt angle of the ferroelectric liquid crystal being at ±45° with respect to the smectic layers.

Liquid-crystal Fabry-Perot filters have been disclosed by Patel in U.S. Pat. Nos. 5,068,749, 5,111,321, and 5,150,236 and in associated publications in conjunction with others. In U.S. Pat. No. 4,779,959, Saunders alludes to liquid-crystal Fabry-Perot modulators having either 180° or 360° twist or alternatively using a ferroelectric smectic liquid crystal, presumably having the prior-art tilt angle of 22°. If an anisotropic material is uniform within a Fabry-Perot cavity, that is, at the large-field limit of the modulator of FIG. 3 with most of the liquid crystal aligned with one of the alignment layers, it produces two resonant wavelengths $\lambda_1$ and $\lambda_2$ polarized along two orthogonal directions. These two directions are co-linear with the principal axes of the anisotropic material. For randomly polarized input light at the two resonant wavelengths, both wavelengths are transmitted, but the output light will be polarized along one direction for $\lambda_1$ and along the orthogonal direction for $\lambda_2$. When an electric field of the opposite polarity is applied across the ferroelectric liquid crystal, the slow and the fast axes interchange, and thus the output polarization directions for the two resonant wavelengths interchange. Alternatively, for input light linearly polarized for both wavelengths, one wavelength is transmitted with one polarity of the applied field and the other is transmitted for the reverse polarity. It is also possible to continuously tune such a filter at low applied voltages.

EXAMPLE 2

A twisted ferroelectric liquid-crystal Fabry-Perot filter was fabricated and tested. Its fabrication followed that of Example 1, but interference mirrors were added following the disclosure of the Patel patents. Alignment layers were deposited on top of the interference layers following the procedures disclosed by Patel et al. in the *Journal of Applied Physics* article. The gap was made to 6.5 μm thick. The CS 2004 ferroelectric liquid crystal was filled into the gap in the isotropic phase. The electric field treatment disclosed by Patel et al. produced mono-domain samples.

The assembled cell was exposed to 1.5 μm light from a light-emitting diode. When a sufficiently high voltage (greater than 10 V/μm) was applied to the liquid crystal to saturate (completely untwist) it, a total of four transmission peaks were observed. Peaks at 1.4916 and 1.6388 μm correspond to eigenmodes polarized along the long axis of the molecules with mode numbers 12 and 13 while the peaks at 1.4836 and 1.6148 correspond to the eigenmodes polarized along the short axis with mode numbers 13 and 14. Restricting the discussion to a single mode number, if a polarizer is added with its polarization axis aligned with one of the stable liquid-crystal states, one wavelength is passed with a positive applied voltage and the other wavelength is passed with a negative applied voltage. It is however pointed out that prolonged exposure of the liquid crystal to a DC bias electrochemically degrades the liquid crystal because of charge migration. The switching times were measured to be between 2 and 4 ms for switching between resonances although it took less than 450 μs to switch out of resonance. It may be possible to improve the switching speeds by making the smectic layers be perpendicular to the propagation direction of the light.

The liquid-crystal modulator of the invention may be easily fabricated in two-dimensional arrays by dividing each of the electrodes 14 and 16 into perpendicular arrays of linearly extending parallel electrodes. The invention thus allows an inexpensive liquid-crystal modulator array having an easily controlled gray scale.

What is claimed is:

1. A twisted ferroelectric liquid-crystal optical modulator, comprising:
   a first assembly and a second assembly arranged a predetermined distance apart with a gap therebetween; and
   a ferroelectric liquid crystal filled into said gap;
   said first assembly comprising a first electrode and a first alignment layer for aligning a first adjacent portion of said liquid crystal in a first direction parallel to said first alignment layer;
   said second assembly comprising a second electrode and a second alignment layer for aligning a second adjacent portion of said liquid crystal in a second direction parallel to said second alignment layer and offset from said first direction by a predetermined angle whereby said ferroelectric liquid crystal is twisted between the first assembly and the second assembly;
   said first and second electrodes being capable of impressing an electric potential across said liquid crystal.

2. A modulator as recited in claim 1, wherein said first and second directions are substantially perpendicular.

3. A modulator as recited in claim 2, wherein said ferroelectric liquid crystal comprises a smectic liquid crystal forming into smectic layers having surfaces at substantially 45° to said two directions.

4. A modulator as recited in claim 3, wherein said ferroelectric liquid crystal has stable tilt angles of substantially ±45°.

5. A modulator as recited in claim 2, wherein said first assembly comprises a first linear polarizer having a first polarization direction and said second assembly comprises a second linear polarizer having a second polarization direction.

6. A modulator as recited in claim 5, wherein said first and second polarization directions are substantially perpendicular.

7. A modulator as recited in claim 5, wherein said first and second polarization directions are substantially parallel.

8. A modulator as recited in claim 5, further comprising a signal source connected across said first and second electrodes that impresses a voltage signal thereacross having a level selected from at least three levels.

9. A modulator as recited in claim 8, wherein said signal is a bipolar signal.

10. A modulator as recited in claim 2, wherein each of said first and second assemblies further comprises an interference mirror.

* * * * *